United States Patent
Uenishi et al.

(10) Patent No.: US 8,330,315 B2
(45) Date of Patent: Dec. 11, 2012

(54) MOTOR

(75) Inventors: Eiji Uenishi, Matsudo (JP); Eiji Mayumi, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 264 days.

(21) Appl. No.: 12/747,336

(22) PCT Filed: Oct. 17, 2008

(86) PCT No.: PCT/JP2008/068832
§ 371 (c)(1),
(2), (4) Date: Jun. 10, 2010

(87) PCT Pub. No.: WO2009/081646
PCT Pub. Date: Jul. 2, 2009

(65) Prior Publication Data
US 2010/0270886 A1 Oct. 28, 2010

(30) Foreign Application Priority Data
Dec. 25, 2007 (JP) ................. 2007-332818

(51) Int. Cl.
*H02K 21/26* (2006.01)
(52) U.S. Cl. .................................. 310/154.29
(58) Field of Classification Search . 310/154.01–154.84
See application file for complete search history.

(56) References Cited

U.S. PATENT DOCUMENTS

| | | | | |
|---|---|---|---|---|
| 4,438,362 A | * | 3/1984 | Brown | 310/152 |
| 6,628,030 B2 | * | 9/2003 | Harada et al. | 310/154.29 |
| 6,987,340 B2 | * | 1/2006 | Kaneshige | 310/154.28 |

FOREIGN PATENT DOCUMENTS

| | | |
|---|---|---|
| JP | 58-079459 | 5/1983 |
| JP | 60-261344 | 12/1985 |
| JP | 05-284707 | 10/1993 |
| JP | 09-182326 | 7/1997 |
| JP | 09-222433 | 8/1997 |
| JP | 2002-300740 | 10/2002 |
| JP | 2004-297861 | 10/2004 |
| JP | 2007-104875 | 4/2007 |
| JP | 2007-175579 | 7/2007 |

* cited by examiner

*Primary Examiner* — Nguyen N Hanh
(74) *Attorney, Agent, or Firm* — McGlew and Tuttle, P.C.

(57) ABSTRACT

Magnetic poles are arranged such that the N pole and the S pole alternate in a circumferential direction. Two N poles face each other with an interval of 180° therebetween, and two S poles face each other with an interval of 180° therebetween. Each of the magnetization center of a North magnetic pole and the magnetization center of a South magnetic pole is positionally shifted from the center position between the magnetization centers of two magnetic poles of the other polarity located on opposite sides of the North or South magnetic pole. The magnetization centers of the magnetic poles are disposed in such a manner as to be positionally shifted from geometric centerlines. Brushes are disposed along the respective geometric centerlines. The magnetization centers of two adjacent magnetic poles are positionally shifted toward or away from each other by the same shift angle α with respect to the respective geometric centerlines.

9 Claims, 8 Drawing Sheets

MOTOR CASING

MAGNET (a) 90° (NEUTRAL)

(b) 85° PITCH (c) 80° PITCH (d) 75° PITCH

MOTOR

TECHNICAL FIELD

The present invention relates to a brushed DC motor having four or more field poles and capable of generating sufficiently large motor current pulses for detecting the rotational speed of the motor from the waveform of current flowing through the motor.

BACKGROUND ART

Conventionally, there is known an apparatus which detects the rotational speed of a brushed DC motor from the waveform of current flowing through the motor without need to use an encoder, a tachogenerator, or the like (refer to Patent Documents 1 and 2).

FIG. 9 shows the conventional pulse detection circuit which is described in Patent Document 1 and adapted to detect rotation pulses generated in association with rotation of a motor. The pulse detection circuit detects through current which flows to the motor from a current detection resistor R connected to the ground side of a motor driver, thereby detecting through current pulses generated in association with rotation of the motor.

The pulse detection circuit includes a differentiation capacitor C; a pulse amplification circuit, which includes an inverting amplifier circuit OA; and a comparison-and-judgment circuit. In the thus-configured pulse detection circuit, when the motor rotates forward or reversely, current pulses generated in association with rotation of the motor flow through the current detection resistor R. The pulses are input to the operational amplifier OA via the differentiation capacitor C and a resistor R1 and amplified therein. At this time, as shown at the upper part of FIG. 10, an output voltage proportional to time differential of a pulse voltage appearing across the current detection resistor R is output from the operational amplifier OA. A voltage divider composed of two resistors R2 and R3 halves a supply voltage Vcc and supplies to a noninverting input of the operational amplifier OA a voltage corresponding to ½ the supply voltage Vcc. Two-thirds (a voltage ratio between resistors R5 and R6) the supply voltage Vcc is input as a threshold voltage to an inverting input of a comparator Comp; thus, when the voltage of an input pulse signal is in excess of the threshold, pulses as shown at the lower part of FIG. 10 are output. In this manner, the illustrated circuit can yield the number of pulses proportional to the rotational speed of the motor through time differential of the pulse voltage appearing across the current detection resistor R. However, when motor current smoothly varies periodically, pulses cannot be detected from the motor current. Particularly, in a motor having four or more field poles, difficulty is encountered in reliably detecting pulses whose magnitude sufficiently exceeds a threshold value, from current flowing through the current detection resistor.

FIG. 11 is a sectional view showing a conventional motor disclosed in Patent Document 3. Field magnets are a first magnet of N pole, a second magnet of S pole, a third magnet of N pole, and a fourth magnet of S pole, wherein the first magnet of N pole and the second magnet of S pole are increased in magnetic flux density through elongation of their arcuate length, and the third magnet of N pole and the fourth magnet of S pole are reduced in magnetic flux density through reduction of their arcuate length. By means of using a pair of magnets of N pole and S pole having high magnetic flux density as a unit and a pair of magnets of N pole and S pole having low magnetic flux density as a unit, an attraction direction T is directed toward a position between the first magnet of N pole and the second magnet of S pole, which have high magnetic flux density. The magnets are disposed such that the magnetic centers of the arcuate surfaces of the magnets form equal spread angles about the center of a rotating shaft.

The illustrated field magnets are configured such that different sizes are imparted to the magnet surfaces which face the outer circumferential surface of an armature core, thereby establishing difference in magnetic force among the magnets. Accordingly, the armature core is attracted toward the magnets on one side, so that the shaft united to the armature core is attracted toward the one side. Therefore, even when a predetermined clearance is provided between the shaft and a bearing, the shaft can be prevented from having play, whereby noise can be reduced. However, merely through employment of difference in magnetic flux density among the magnets, there cannot be generated a sufficiently high pulse voltage for detection by such a pulse detection circuit as described in Patent Document 1 mentioned above.

Patent Document 1: Japanese Patent Application Laid-Open (kokai) No. 2004-297861
Patent Document 2: Japanese Patent Application Laid-Open (kokai) No. H9-222433
Patent Document 3: Japanese Patent Application Laid-Open (kokai) No. 2007-104875

DISCLOSURE OF THE INVENTION

Problems to be Solved by the Invention

An object of the present invention is to provide a brushed DC motor having four or more field poles and capable of generating sufficiently large motor current pulses for detecting the rotational speed of the motor from the waveform of current flowing through the motor without need to use a special apparatus for detecting the rotational speed of a motor.

Another object of the present invention is to generate fluctuations in a current waveform through shifting of the changeover timing of brushes while the centers of mutually facing magnetic poles are aligned with each other to prevent an increase in vibration which could otherwise result from uneven rotation, and to utilize the fluctuations of the current waveform for detecting rotation.

Means for Solving the Problems

A brushed DC motor of the present invention comprises a magnet attached to an inner peripheral surface of a motor housing and adapted to serve as a multi-pole field magnet having four or more magnetic poles, a rotor having a rotor pole structure and a commutator mounted on a rotatably supported shaft, and brushes in contact with the commutator. The magnetic poles are arranged such that North magnetic poles and South magnetic poles alternate in a circumferential direction, two North magnetic poles face each other with an interval of 180° therebetween, and two South magnetic poles face each other with an interval of 180° therebetween. Each of the magnetization center of each North magnetic pole and the magnetization center of each South magnetic pole is positionally shifted from the center position between magnetization centers of two magnetic poles of the other polarity located on opposite sides of the North or South magnetic pole.

The magnetization centers of the magnetic poles are disposed in such a manner as to be positionally shifted from geometric centerlines positioned at equal intervals. The brushes are not disposed on the magnetization centerlines of the magnetic poles. The brushes are disposed along the respective geometric centerlines. The magnetization centers of two adjacent magnetic poles are positionally shifted toward or away from each other by the same shift angle α with respect to the respective geometric centerlines.

In the case of four magnetic poles, two adjacent pitch angles between the magnetization centers of adjacent magnetic poles are called pitch angle 1 and pitch angle 2, and pitch angle 1 is a smaller pitch angle. The pitch angle 1 is smaller than pitch angle 2; the sum of pitch angle 1 and pitch angle 2 is 180°; and pitch angle 1 is 75° to 85° inclusive. The magnetic poles are magnetized such that the surface magnetic flux density of each magnetic pole becomes the maximum at the magnetization center thereof, and the magnetic poles have substantially the same maximum surface magnetic flux density.

The magnet is formed integrally from a magnet material into a generally ring-like shape. The magnet in the shape of a ring has a generally square outline; the inside diameter of the magnet is slightly greater than the outside diameter of the rotor; the magnet has an uneven thickness such that side portions of the magnet are thin-walled, and corner portions of the magnet are thick-walled; and the magnet has four magnetic poles which are magnetized radially and whose polarity alternates in the circumferential direction. Each of magnetic poles is formed symmetrically with respect to a geometric centerline, rather than a magnetization centerline.

Effects of the Invention

According to the present invention, in a brushed DC motor having four or more field poles, the centers of mutually facing magnetic poles are aligned with each other to thereby avoid an increase in mechanical noise and vibration, and a shift of brush changeover timing enables the generation of a current waveform from which rotation can be readily detected without need to use a special detection apparatus.

BEST MODE FOR CARRYING OUT THE INVENTION

Figure 1:
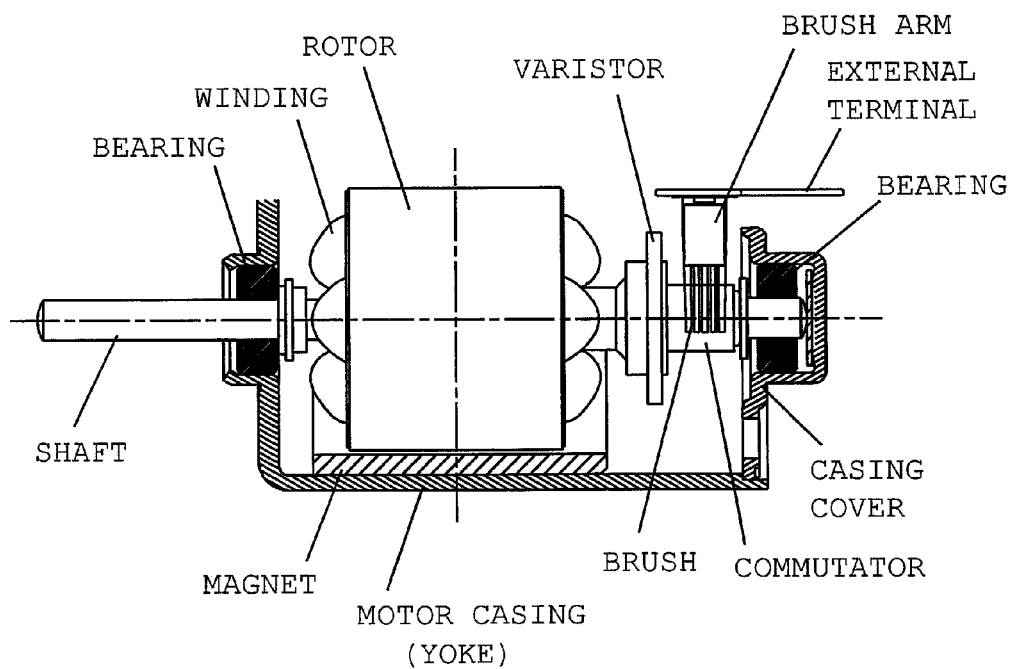
FIG. 1 is a longitudinal, partially sectional view showing the configuration of a small motor having a quadrangular external shape which embodies the present invention.
Figure 2:
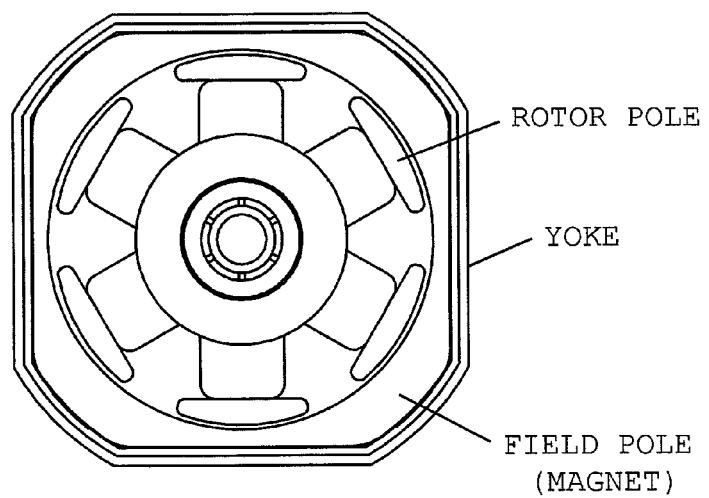
FIG. 2 is a side view of the motor shown in FIG. 1 as viewed from the commutator side with a casing cover removed.

The present invention will next be described by way of example. FIG. 1 is a longitudinal, partially sectional view showing the configuration of a small motor having a quadrangular external shape which embodies the present invention. FIG. 2 is a side view of the motor shown in FIG. 1 as viewed from the commutator side with a casing cover removed. A small motor having a quadrangular (square) external shape and having a 4-pole field magnet and six rotor poles will be described below. However, the present invention can be applied to a small motor having four or more field poles and three or more rotor poles. The small motor can have other external shapes, such as a circular external shape.

As illustrated, a magnet which serves as field poles is attached to the inner peripheral surface of a motor casing. The motor casing is formed from a metallic material into a closed-bottomed tubular shape by press working. A quadrangular side of the motor casing made of metal and having a substantially fixed plate thickness serves as a yoke, which, in turn, serves as a magnetic path for the magnet. The motor casing and a casing cover fitted to an opening portion of the motor casing constitute a motor housing. A shaft of a rotor is supported by bearings provided at a central portion of the casing cover and at the center of a bottom portion of the motor casing. A rotor configured on the shaft includes a rotor pole structure, which is composed of a pole core and windings wound on the pole core. A commutator is fixed on the shaft and has a varistor at an end portion thereof for quenching sparks. A pair (or two pairs) of brushes in contact with the commutator are supported by the casing cover via respective brush arms and are externally supplied with power via a pair of external terminals connected to the brush arms.

Figure 3A:
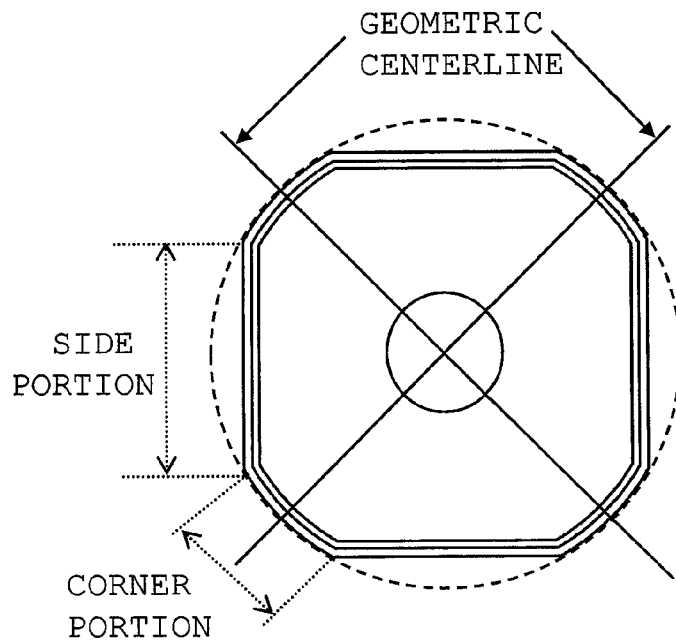
FIG. 3(A) is a side view of a motor casing.
Figure 3B:
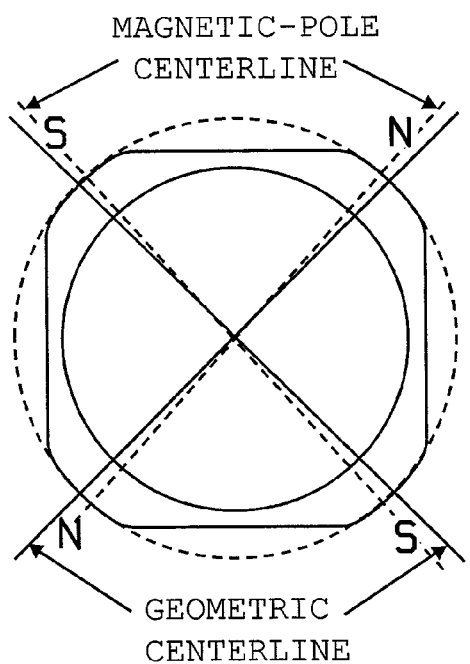
FIG. 3(B) is a side view of a magnet.

FIGS. 3(A) and 3(B) are side views showing the motor casing and the magnet, respectively. The external shape of the magnet is substantially identical with the inner peripheral shape of the motor casing. The magnet is attached to the inside of the motor casing by means of press-fitting or bonding. The side of the motor casing, which serves as a yoke, is configured such that four flat side portions (flat walls) equal in number to four field poles, and four corner portions equal in number to four field poles and located at respective corners between the side portions are continuously joined together. The corner portions fixedly support the magnet at the inner sides of the corner portions and each assume an arcuate shape.

The magnet is magnetized radially and has four poles such that N and S poles alternate in the circumferential direction. The illustrated magnet is formed integrally from a magnet material into a generally ring-like shape. The ring-shaped magnet has an inside diameter slightly greater than the outside diameter of the rotor and has an uneven thickness such that side portions of the magnet are thin-walled, and corner portions of the magnet are thick-walled. Through implementation of uneven magnet thickness as mentioned above, the magnetic flux of the magnet smoothly reduces at the side portions of the magnet with increasing circumferential distance from the circumferential centers of the corner portions of the magnet (from the illustrated geometric centerlines), whereby cogging torque can be lowered. In the magnet shown in FIG. 3(B), circumferential magnetic-pole centers (vertexes of magnetic poles) are disposed in such a manner as to be positionally shifted from two geometric centerlines orthogonal to each other (the geometric centerlines form an angle of 90 degrees). As illustrated, in the motor having a square external shape, geometric centerlines pass through the motor center as well as the circumferential centers of the corner portions of the magnet. The brushes are disposed along the geometric centerlines.

Figure 4:
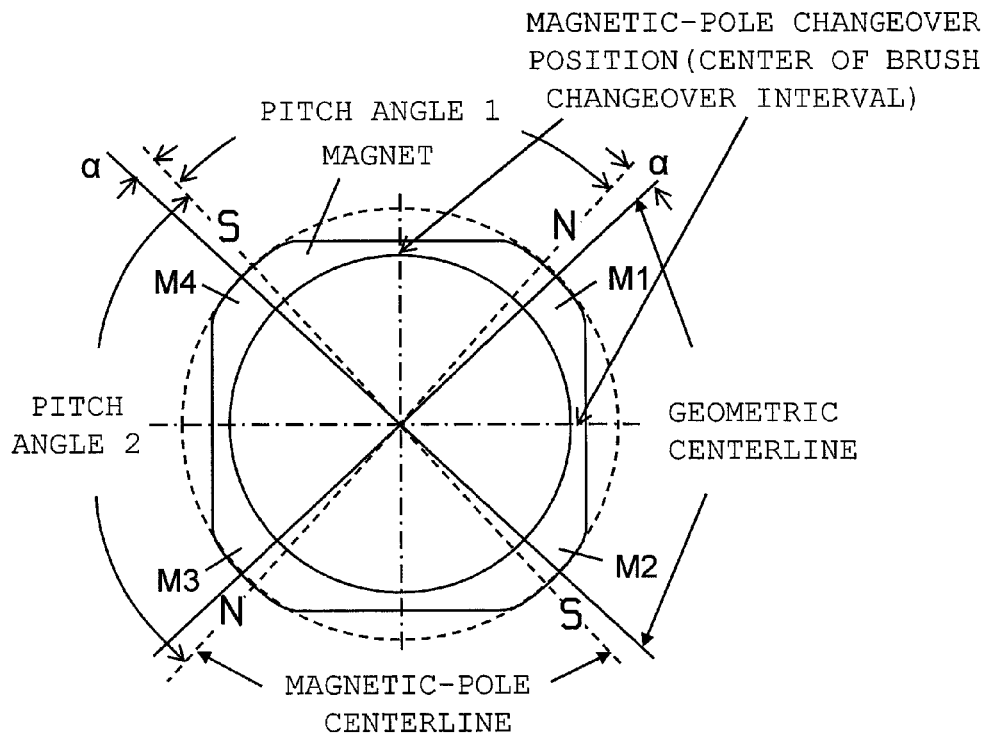
FIG. 4 is a view for explaining magnetization of the magnet.

FIG. 4 is a view for explaining magnetization of the magnet. As illustrated, magnetic poles are magnetized radially and such that the N pole and the S pole alternate in the circumferential direction. Two N poles face each other with an interval of 180° therebetween, and two S poles face each other with an interval of 180° therebetween. As illustrated, each S pole is not located at the circumferential center position between the N poles, but is located at a position shifted from the center position (pitch angle 1<pitch angle 2). Similarly, each N pole is located at a position shifted from the circumferential center position between the S poles. The magnetization center (center) of each of the magnetic poles means a position where surface magnetic flux density is maximized. The magnetic poles are magnetized in such a manner as to have substantially the same maximum surface magnetic flux density.

As illustrated, the magnetization centers of two adjacent magnetic poles are positionally shifted toward or away from each other by the same shift angle α with respect to two respective geometric centerlines orthogonal to each other. As illustrated, four magnetic poles are denoted by M1 to M4, respectively. The magnetic poles M1 and M4 are magnetized such that the magnetization centers thereof are positionally shifted toward each other by the same shift angle α with respect to the respective geometric centerlines, and the magnetic poles M2 and M3 are also magnetized similarly. As a result, the center between the magnetic poles M1 and M4 and the center between the magnetic poles M2 and M3 (magnetic-pole changeover positions where the polarity of one of adjacent magnetic poles is inverted to the polarity of the other one of the adjacent magnetic poles) coincide with the center of a changeover interval of the brushes located on the respective geometric centerlines.

Accordingly, the magnetization centers of the magnetic poles M1 and M2 are positionally shifted away from each other by the same shift angle α with respect to the respective geometric centerlines, and the magnetization centers of the magnetic poles M3 and M4 are also positionally shifted similarly. Similarly, the center between the magnetic poles M1 and M2 and the center between the magnetic poles M3 and M4 (magnetic-pole changeover positions) coincide with the center of the brush changeover interval.

Two adjacent pitch angles between the magnetization centers of adjacent magnetic poles (N pole and S pole) are called pitch angle 1 and pitch angle 2. In the present invention, pitch angle 1 and pitch angle 2 differ from each other such that pitch angle 1 is a smaller pitch angle (pitch angle 1<pitch angle 2). Pitch angles which face each other with respect to the center of the shaft are equal to each other. Pitch angle 1 plus pitch angle 2 is equal to 180°. In other words, the N poles and the S poles (magnetization centers thereof) are located at respective positions which are positionally shifted by the same shift angle α from two respective geometric centerlines orthogonal to each other. That is, the following relation is established: 2×α+pitch angle 1=pitch angle 2−2×α=90°. Desirably, pitch angle 1 is 75° to 85° inclusive as will be described later.

As mentioned above, the magnetic poles of the present invention are characterized in that their magnetization centers are positionally shifted. Magnetic poles can be formed in a circumferentially symmetrical manner with respect to the positionally shifted magnetization centers. However, in the case of the illustrated motor having a square external shape, from a geometric point of view, it is desirable to arrange magnetic poles of the same shape at equal intervals. In this case, the magnetic poles are symmetrically formed with respect to the respective geometric centerlines, rather than the respective magnetization centerlines of magnetic poles. In the motor having a square external shape, the center between the opposed corner portions of the yoke and the center between the opposed side portions of the yoke coincide with the center of the motor shaft (thus, the centers of bearings). Furthermore, the center for the outside radius of and the center for the inside radius of the corner portions of the magnet coincide with the center of the motor. Thus, the assembly of the motor is facilitated.

Any conventionally used material, such as a ferrite magnet, a neodymium magnet, or a plastic magnet, can be used as material for the magnet. Such a magnet can be fixed into the motor casing after being magnetized so as to have four poles by use of a magnetic-field generator. Desirably, magnetization is performed after fixation into the motor casing. Specifically, a magnetic material is integrally formed into a ring shape; the ring-shaped magnetic material is fixed into the motor casing; and then, by use of a magnetic-field generator, the ring-shaped magnetic material is magnetized from the outside of the motor casing or from the inside of the magnetic material fixed to the motor casing, so as to form a 4-pole magnet.

Figure 5:
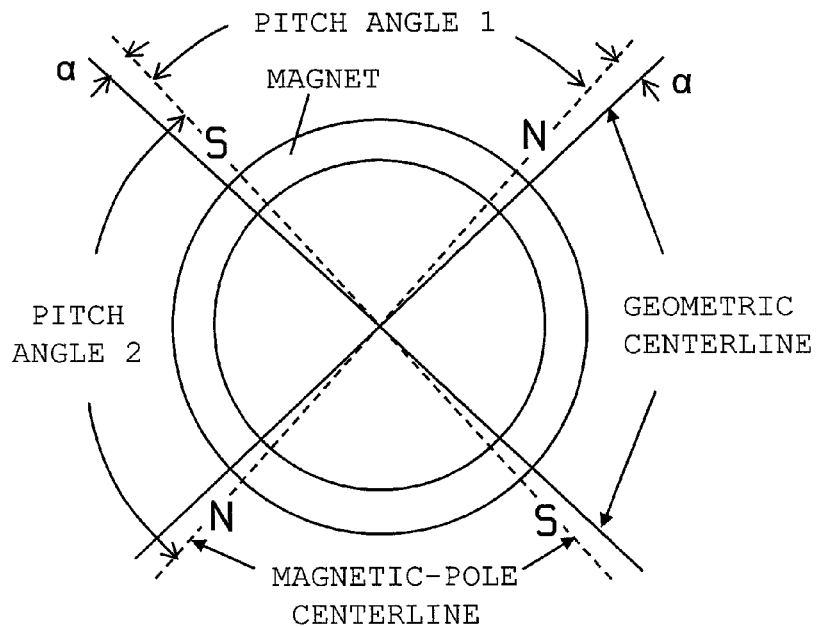
FIG. 5 is a view for explaining a magnetization example for a cylindrical magnet which can be used in a motor having a circular external shape.

FIG. 5 is a view for explaining a magnetization example for a cylindrical magnet which can be used in a motor having a circular external shape. Since a cylindrical magnet can also be magnetized in a manner similar to that shown in FIG. 4, detailed description of the magnetization is omitted.

Figure 6:
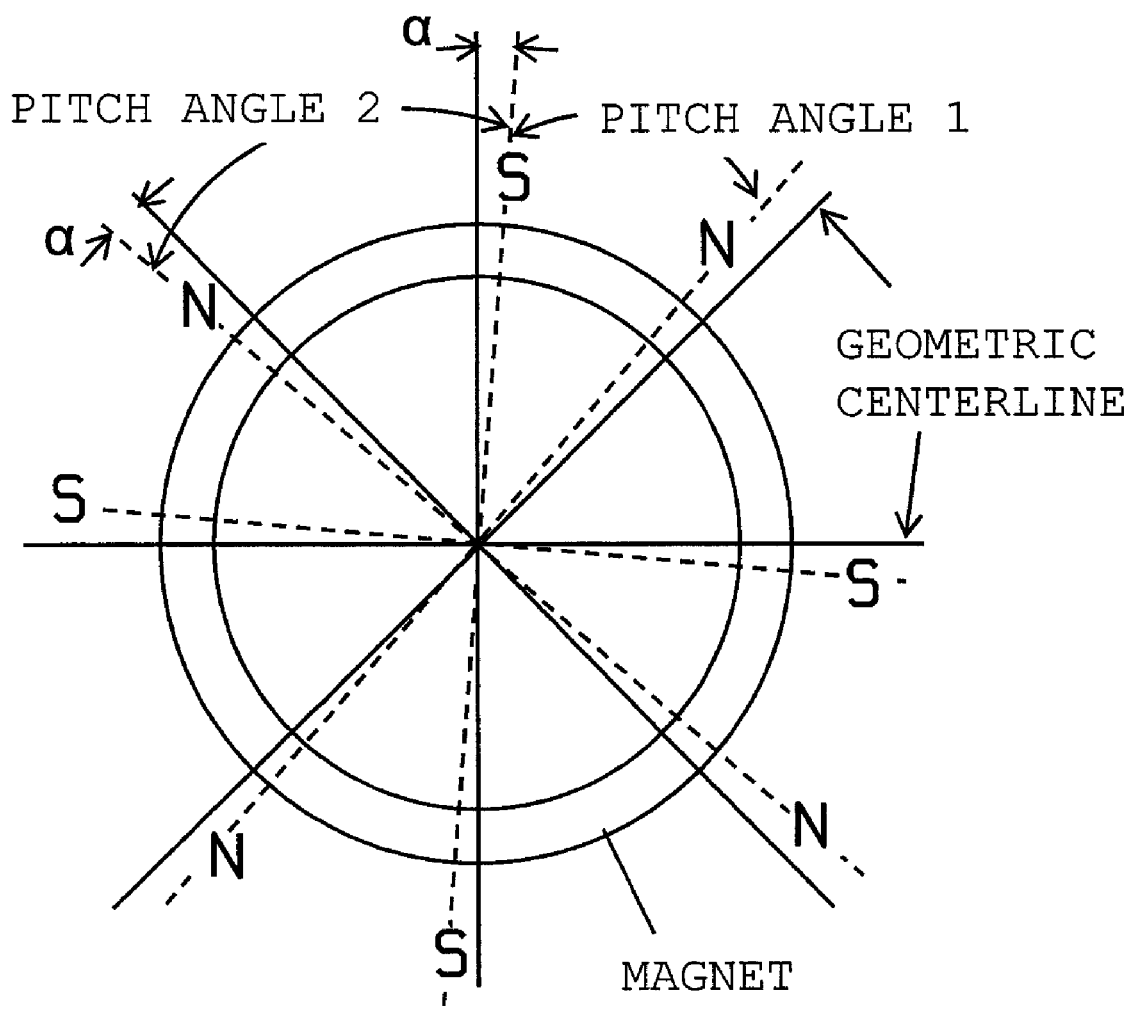
FIG. 6 is a view for explaining magnetization of an 8-pole magnet.

FIG. 6 is a view for explaining magnetization of an 8-pole magnet. The 8-pole magnet can also be magnetized in a manner similar to that for the 4-pole magnet described above. As illustrated, similar to the 4-pole magnet, magnetic poles are magnetized radially and such that the N pole and the S pole alternate in the circumferential direction. Additionally, two N poles face each other with an interval of 180° therebetween, and two S poles face each other with an interval of 180° therebetween. However, in the 8-pole magnet, at the center between two N poles (or two S poles) which face each other with an interval of 180° therebetween, another pair of N poles (or S poles) is disposed such that the N poles (or S poles) face each other with an interval of 180° therebetween. In other words, four N poles (or S poles) are disposed at circumferentially equal intervals.

The positional relation between the N poles and the S poles is similar to that of the 4-pole magnet described above. Specifically, each S pole is not located at the center position between adjacent N poles, but is located at a position shifted from the center position (pitch angle 1<pitch angle 2). Similarly, each N pole is located at a position shifted from the center position between adjacent S poles. Accordingly, the magnetization centers of two adjacent magnetic poles are positionally shifted toward or away from each other by the same shift angle α with respect to respective geometric centerlines. In the case of a cylindrical 8-pole magnet, geometric centerlines pass through the center and divide the circumference into equal intervals of 45°. For example, a pair of brushes is disposed along two adjacent ones of the geometric centerlines.

Figure 7A:
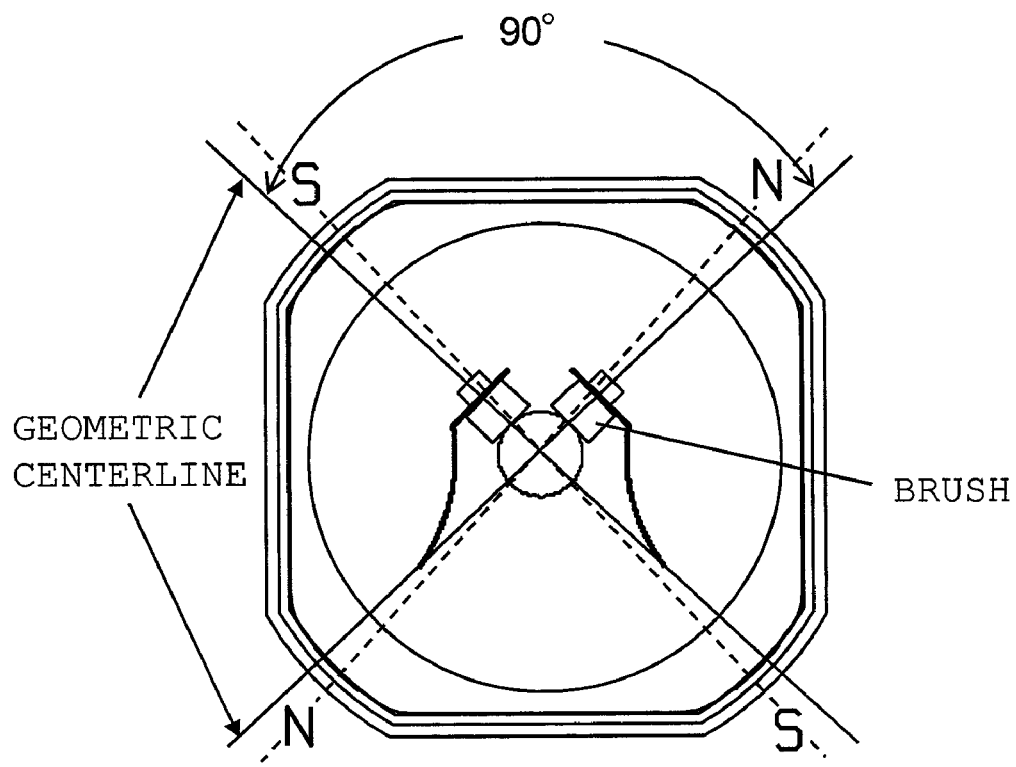
FIG. 7(A) is a view conceptually showing the arrangement of brushes.
Figure 7B:
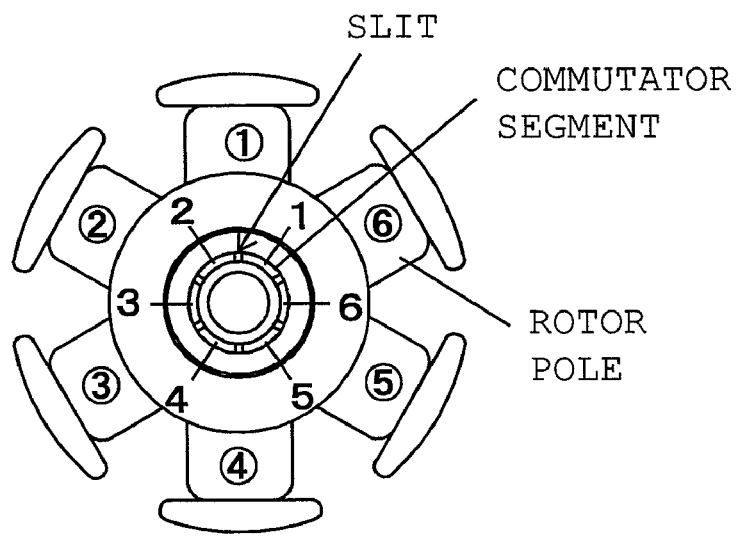
FIG. 7(B) is a side view of a rotor as viewed from the commutator side.

Next, taking as an example a motor having a 4-pole field magnet and six rotor poles, supply of current to windings will be described with reference to FIGS. 7(A) and 7(B). FIG. 7(A) is a view conceptually showing the arrangement of brushes, and FIG. 7(B) is a side view of a rotor as viewed from the commutator side. Rotor configuration and brush arrangement to be described below with reference to FIGS. 7(A) and 7(B) can be conventionally known ordinary ones. A pair of brushes (two pairs of brushes can also be used) is disposed on the stator side in such a manner as to be positionally coincide with geometric centerlines at an interval of 90° therebetween. Six commutator segments 1 to 6 are disposed on the rotor side with slits provided therebetween. Six magnetic pole cores of the rotor are denoted by circled FIGS. 1 to 6.

The slits between the commutator segments are located typically at center positions of arms of the magnetic pole cores (circumferential center positions of the magnetic pole cores). Typically, winding starts from commutator segment 1 and is sequentially wound on the magnetic pole cores and connected to the commutator segments in the order of magnetic pole core 4, magnetic pole core 1, commutator segment 2, commutator segment 5, magnetic pole core 5, magnetic pole core 2, commutator segment 3, commutator segment 6, magnetic pole core 6, magnetic pole core 3, commutator segment 4, and the initial commutator segment 1.

Figure 8:
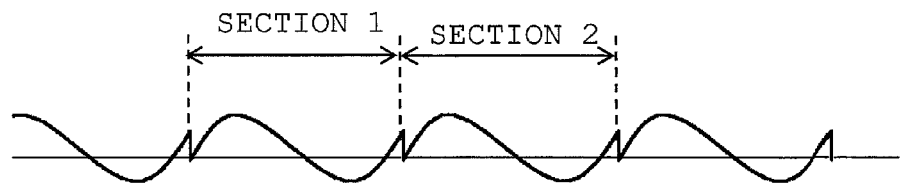
FIG. 8 is a series of diagrams each showing a waveform of current flowing through a motor when the pitch angle between magnetic poles is varied from 90° to 75°.
Figure 8:
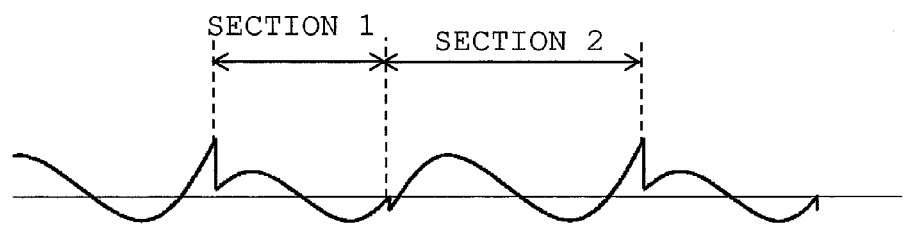
Figure 8:
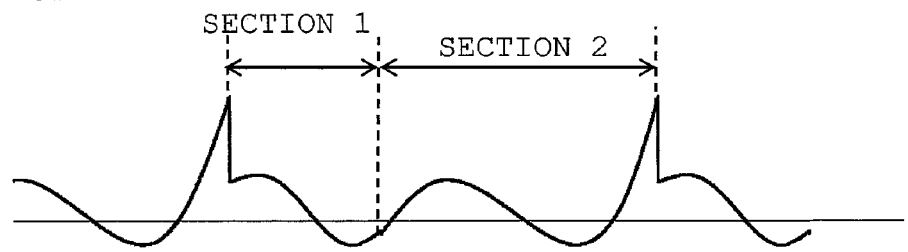
Figure 8:
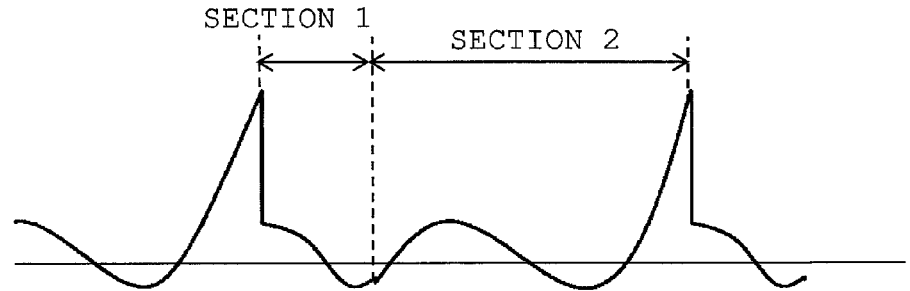
Figure 9:
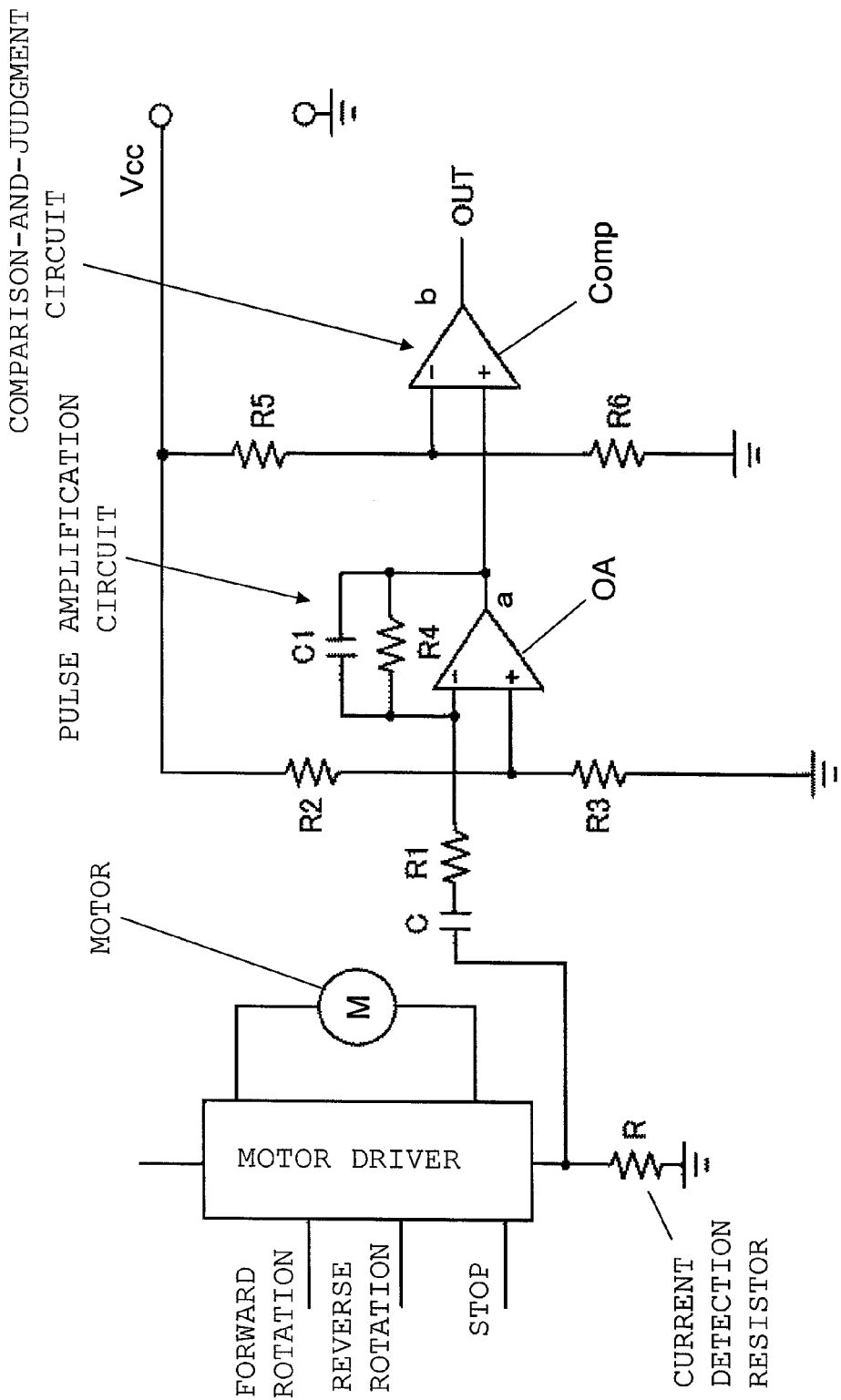
FIG. 9 is a diagram showing a conventional pulse detection circuit which is described in Patent Document 1 and adapted to detect rotation pulses generated in association with rotation of a motor.
Figure 10:
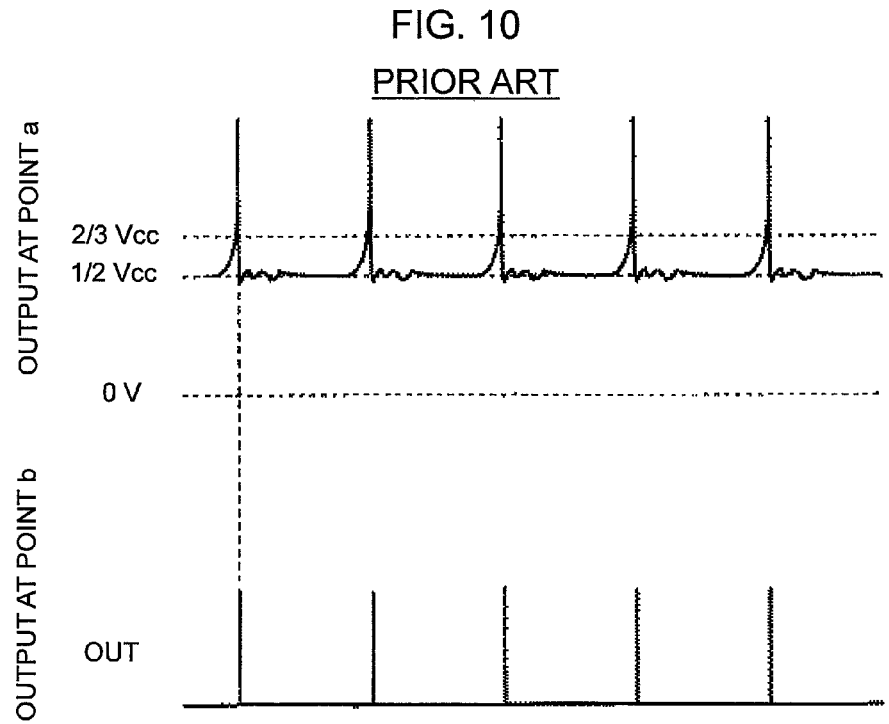
FIG. 10 is a diagram showing outputs from the pulse detection circuit of FIG. 9.
Figure 11:
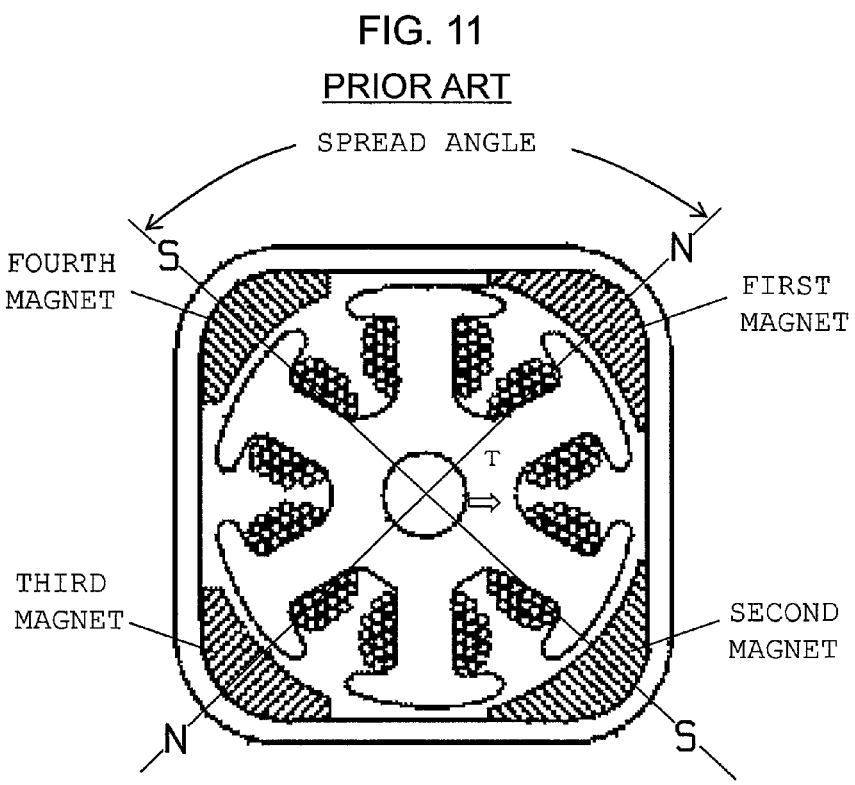
FIG. 11 is a sectional view showing a conventional motor disclosed in Patent Document 3.

FIG. 8 is a series of diagrams each showing a waveform of current flowing through a motor when the pitch angle between adjacent magnetic poles of four magnetic poles is varied from 90° to 75°. FIG. 8 shows the results of actual measurement by use of actually manufactured motors. In FIG. 8, (a) shows a case (prior art) which employs a shift angle α of 0 and even pitch angles (pitch angle 1=pitch angle 2). In FIG. 8, (b) to (d) show current waveforms in the case of the pitch angle 1 shown in FIG. 4 or 5 (a smaller pitch angle) of 85°, 80°, and 75°, respectively.

In (a) of FIG. 8, boundaries between sections correspond to a brush changeover position as well as a magnetic-pole changeover position of the magnet. At the center of each of the sections, the surface magnetic flux density of each of the magnetic poles and a counter electromotive voltage are maximized. Each of the sections, which are section 1, section 2, section 1, section 2, . . . , extends from a point at which each of the brushes starts contacting one commutator segment to a point at which the brush leaves the commutator segment. A differential voltage between a constant supply voltage and the counter electromotive voltage is applied to motor windings. When each of the brushes starts contacting one commutator segment, a substantially high voltage is applied to motor windings, since the counter electromotive voltage is low. However, since the motor windings have inductance, current rises with a predetermined time constant. After rising, current flows in proportion to the differential voltage between the supply voltage and the counter electromotive voltage.

In (a) of FIG. 8, at the center of each of the sections, the counter electromotive voltage is maximized, and, near the end of each of the sections, the counter electromotive voltage drops, so that current increases. Then, each of the brushes contacts the next adjacent commutator segment. When each of the brushes separates from one commutator segment and comes into contact with an adjacent commutator segment, a pulse detecting section detects a current fluctuation in a transition state in which the flow of current stops in one section and starts in a subsequent section, and generates a pulse output. However, as mentioned previously, a sufficiently large pulse output for enabling motor control cannot be generated. Particularly, when the brushes wear in the course of time of use of the brushes, the brushes come into surface contact, rather than point contact, with the commutator segments. Thus, the magnitude of the fluctuation of motor current reduces further.

Next, cases of a pitch angle of 85° to 75° shown in (b) to (d) of FIG. 8 will be described. Section 1 in these cases corresponds to pitch angle 1 shown in FIGS. 4 and 5. At the end of section 1, a small current fluctuation associated with magnetic-pole polarity changeover arises. Immediately after start of section 2, each of the brushes separates from one commutator segment and comes into contact with an adjacent commutator segment. At this time, a current fluctuation of a detectable magnitude does not arise. Next, near the end of section 2 corresponding to pitch angle 2, the counter electromotive voltage drops, so that current increases. Furthermore, after sufficient increase of current, each of the brushes comes into contact with an adjacent commutator segment. At this time, a current fluctuation becomes sufficiently large. The pulse detecting section detects this current fluctuation and generates a pulse output, whereby motor control is performed. Notably, the number of pulses detected in the present invention corresponds to the frequency of current changeover which occurs at every other slit between commutator segments, and is half that in an ordinary case of a pitch angle of 90° ((a) of FIG. 8).

As shown in FIG. 8, the magnitude of a motor current fluctuation increases as pitch angle 1 (see FIG. 4 or 5) reduces, thereby ensuring generation of pulse output. However, it is unnecessary to increase the magnitude of a current fluctuation in excess of a magnitude which the pulse detecting section can detect. A current fluctuation of an unnecessarily large magnitude causes generation of motor vibration and noise. Therefore, a pitch angle 1 of 75° to 85° inclusive is preferred, since a produced current fluctuation can be reliably detected by the pulse detecting section, and the magnitude of the current fluctuation is not unnecessarily large.

In the present disclosure, several embodiments have been described in detail as mere illustrative examples. However, the embodiments may be modified in various manners without substantially departing from the new teaching and advantageous effects of the present invention.

The invention claimed is:

1. A brushed DC motor comprising:
a magnet attached to an inner peripheral surface of a motor housing and adapted to serve as a multi-pole field magnet having four or more magnetic poles;
a rotor having a rotor pole structure and a commutator mounted on a rotatably supported shaft; and
brushes in contact with the commutator, wherein the magnetic poles are arranged such that North magnetic poles and South magnetic poles alternate in a circumferential direction, and each of a magnetization center of each North magnetic pole and a magnetization center of each South magnetic pole is positionally shifted from a center position between magnetization centers of two magnetic poles of the other polarity located on opposite sides of the North or South magnetic pole, wherein the brushes are disposed in such a manner as to be positionally shifted from the magnetization centers of the magnetic poles.

2. A brushed DC motor according to claim 1, wherein the magnetization centers of the magnetic poles are disposed in such a manner as to be positionally shifted from geometric centerlines positioned at equal intervals.

3. A brushed DC motor according to claim 2, wherein the brushes are disposed along the respective geometric centerlines positioned at equal intervals.

4. A brushed DC motor according to claim 3, wherein the magnetization centers of two adjacent magnetic poles are positionally shifted toward or away from each other by the same shift angle with respect to the respective geometric centerlines.

5. A brushed DC motor according to claim 4, wherein the number of the magnetic poles is four, and, when two adjacent pitch angles between the magnetization centers of adjacent magnetic poles are called pitch angle 1 and pitch angle 2, and pitch angle 1 is a smaller pitch angle, pitch angle 1<pitch angle 2,
pitch angle 1+pitch angle 2=180°, and
pitch angle 1 is 75° to 85° inclusive.

6. A brushed DC motor according to claim 5, wherein the magnetic poles are magnetized such that the surface magnetic flux density of each magnetic pole becomes the maximum at the magnetization center thereof, and the magnetic poles have substantially the same maximum surface magnetic flux density.

7. A brushed DC motor according to claim 6, wherein the magnet is formed integrally from a magnet material into a generally ring-like shape.

8. A brushed DC motor according to claim 7, wherein:
the magnet in the shape of a ring has a generally square outline;
an inside diameter of the magnet is slightly greater than an outside diameter of the rotor;
the magnet has an uneven thickness such that side portions of the magnet are thin-walled, and corner portions of the magnet are thick-walled; and
the magnet has four magnetic poles which are magnetized radially and whose polarity alternates in the circumferential direction.

9. A brushed DC motor according to claim 8, wherein each of magnetic poles is formed symmetrically with respect to a geometric centerline.

\* \* \* \* \*